(12) United States Patent
Kawakami et al.

(10) Patent No.: US 12,556,103 B2
(45) Date of Patent: Feb. 17, 2026

(54) CONVERSION DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Takafumi Kawakami, Yokkaichi (JP); Masayoshi Hirota, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 631 days.

(21) Appl. No.: 18/004,092

(22) PCT Filed: Jul. 9, 2021

(86) PCT No.: PCT/JP2021/025940
§ 371 (c)(1),
(2) Date: Jan. 3, 2023

(87) PCT Pub. No.: WO2022/009981
PCT Pub. Date: Jan. 13, 2022

(65) Prior Publication Data
US 2023/0275518 A1    Aug. 31, 2023

(30) Foreign Application Priority Data

Jul. 10, 2020 (JP) ................................ 2020-118921

(51) Int. Cl.
*H02J 7/00* (2006.01)
*B60L 53/22* (2019.01)
(Continued)

(52) U.S. Cl.
CPC ......... *H02M 3/33573* (2021.05); *B60L 53/22* (2019.02); *B60L 58/19* (2019.02);
(Continued)

(58) Field of Classification Search
CPC ......... H02M 3/33573; H02M 3/33561; H02M 3/33576; H02M 7/219; B60L 53/22;
(Continued)

(56) References Cited

U.S. PATENT DOCUMENTS

| | | | |
|---|---|---|---|
| 11,418,125 B2 * | 8/2022 | Yenduri | H02M 5/4585 |
| 2014/0354058 A1 * | 12/2014 | Guo | B60L 53/11 |
| | | | 307/52 |
| 2016/0016479 A1 * | 1/2016 | Khaligh | H02M 1/4258 |
| | | | 336/170 |

(Continued)

FOREIGN PATENT DOCUMENTS

| | | |
|---|---|---|
| JP | 2019-080473 A | 5/2019 |
| WO | 2019-082776 A1 | 5/2019 |
| WO | 2020-184630 A1 | 9/2020 |

OTHER PUBLICATIONS

International Search Report, Application No. PCT/JP2021/025940, mailed Oct. 12, 2021. ISA/Japan Patent Office.

*Primary Examiner* — Alexis B Pacheco
(74) *Attorney, Agent, or Firm* — Honigman LLP

(57) ABSTRACT

In a conversion device, a second conversion circuit may be connected to a second coil of a transformer to perform bidirectional power conversion. Another second conversion circuit may be connected to a second coil of another transformer to perform bidirectional power conversion. A third conversion circuit may convert AC power input to another second coil of the transformer to DC power and output the DC power to a common path. Another third conversion circuit may convert AC power input to another second coil of the other transformer to DC power and output the DC power to the common path.

14 Claims, 9 Drawing Sheets

(51) Int. Cl.
*B60L 58/19* (2019.01)
*B60L 58/22* (2019.01)
*H02J 7/14* (2006.01)
*H02M 3/335* (2006.01)
*H02M 7/219* (2006.01)
*B60L 1/00* (2006.01)

(52) U.S. Cl.
CPC ......... *B60L 58/22* (2019.02); *H02M 3/33561* (2013.01); *H02M 3/33576* (2013.01); *H02M 7/219* (2013.01); *B60L 1/00* (2013.01); *B60L 2210/30* (2013.01); *B60L 2210/40* (2013.01)

(58) Field of Classification Search
CPC ............ B60L 58/19; B60L 58/22; B60L 1/00; B60L 2210/30; B60L 2210/40
USPC ....................................................... 320/134
See application file for complete search history.

(56) References Cited

U.S. PATENT DOCUMENTS

| | | | |
|---|---|---|---|
| 2016/0023571 A1* | 1/2016 | Wu | B60L 53/20 320/112 |
| 2016/0241028 A1* | 8/2016 | Long | H02J 7/0018 |
| 2017/0033678 A1* | 2/2017 | Park | H02M 3/156 |
| 2017/0361711 A1* | 12/2017 | Fukushima | B60L 50/53 |
| 2021/0122255 A1* | 4/2021 | Liang | B60L 1/006 |
| 2022/0093978 A1* | 3/2022 | Moon | H01M 10/441 |
| 2022/0385087 A1* | 12/2022 | Sarnago Andia | H02M 3/33584 |
| 2023/0121220 A1* | 4/2023 | Gannamaneni | B60L 53/20 320/109 |
| 2023/0223840 A1* | 7/2023 | Zhu | B60L 1/00 363/84 |
| 2023/0275465 A1* | 8/2023 | Sakamoto | H02M 3/00 307/11 |
| 2023/0275518 A1* | 8/2023 | Kawakami | H02M 3/33584 320/117 |

* cited by examiner

LEGEND
A= Electric outlet

LEGEND
A= Electric outlet

LEGEND
A= Electric outlet

CONVERSION DEVICE

CROSS-REFERENCE TO RELATED APPLICATIONS

This application is the U.S. national stage of PCT/JP2021/025940 filed on Jul. 9, 2021, which claims priority of Japanese Patent Application No. JP 2020-118921 filed on Jul. 10, 2020, the contents of which are incorporated herein.

TECHNICAL FIELD

The present disclosure relates to a conversion device.

BACKGROUND

JP 2019-80473A discloses a power storage system that is mounted in a vehicle. The power storage system includes: a plurality of power storage modules that can be switched in series or in parallel; and an in-vehicle charger that can charge the plurality of power storage modules based on electric power supplied from an external charger.

In the power storage system disclosed in JP 2019-80473A, prior to switching the plurality of power storage modules in parallel, voltage balancing processing is performed to cause an electric power converter to perform an operation such that the potential difference between the plurality of power storage modules takes a value less than or equal to a predetermined threshold value. However, at the time of the voltage balancing processing, the power storage system is required to reflux electric power via a primary switching circuit and a capacitor, and a large ripple current flows through the capacitor, and it is therefore necessary to provide a high-capacity capacitor. Accordingly, an increase in capacitor size and an increase in cost have been a concern for the power storage system.

It is an object of the present disclosure to provide a technique, with which it is possible to perform an operation of reducing the difference between the output voltage of a first battery unit and the output voltage of a second battery unit while suppressing the load applied to a capacitor.

SUMMARY

A conversion device according to an aspect of the present disclosure is a conversion device used in a power supply system including: a power supply device in which a first battery unit and a second battery unit are switched between a series connection and a parallel connection; a plurality of first conversion circuits that each convert DC power input to DC ends thereof to AC power and output the AC power to AC ends thereof; a plurality of transformers in each of which a first coil that is connected to the AC ends of a corresponding one of the plurality of first conversion circuits is magnetically coupled to a plurality of second coils; and a plurality of capacitors that are each connected to the DC ends of a corresponding one of the plurality of first conversion circuits. The conversion device includes: the plurality of first conversion circuits; the plurality of transformers that are connected to the plurality of first conversion circuits in one-to-one correspondence; a plurality of second conversion circuits; and a plurality of third conversion circuits. One of the plurality of second conversion circuits performs a first operation and a second operation, the first operation being an operation of converting AC power generated at one of the plurality of second coils of one of the plurality of transformers to DC power and outputting the DC power to the first battery unit, and the second operation being an operation of converting DC power input from the first battery unit to generate AC power at the one of the plurality of second coils of the one of the plurality of transformers. Another one of the plurality of second conversion circuits performs a third operation and a fourth operation, the third operation being an operation of converting AC power generated at one of the plurality of second coils of another one of the plurality of transformers to DC power and outputting the DC power to the second battery unit, and the fourth operation being an operation of converting DC power input from the second battery unit to generate AC power at the one of the plurality of second coils of the other one of the plurality of transformers. One of the plurality of third conversion circuits performs a fifth operation of converting AC power input to another one of the plurality of second coils of the one of the plurality of transformers to DC power and outputting the DC power to a common path. Another one of the plurality of third conversion circuits performs a sixth operation of converting AC power input to another one of the plurality of second coils of the other one of the plurality of transformers to DC power and outputting the DC power to the common path.

The conversion device according to the aspect of the present disclosure can perform an operation of reducing the difference between the output voltage of the first battery unit and the output voltage of the second battery unit while suppressing the load applied to the capacitors.

DETAILED DESCRIPTION OF PREFERRED EMBODIMENTS

Figure 1:
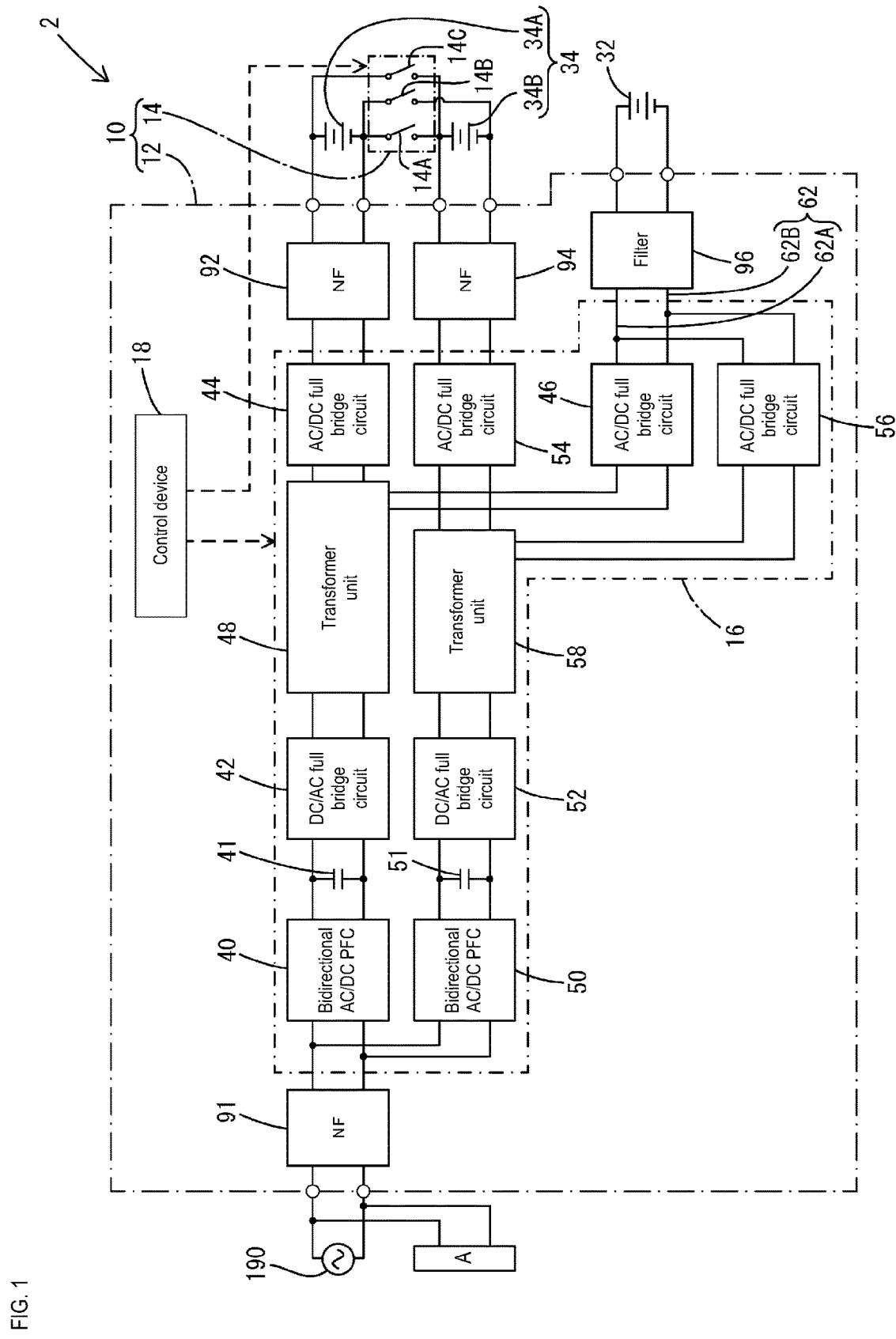
FIG. 1 is a block diagram schematically showing an example of an in-vehicle system that includes a power supply system according to a first embodiment of the present disclosure.

Hereinafter, aspects of an embodiment according to the present disclosure will be listed and described. Features shown in [1] to [7] below may be combined in any way unless they are contradictory to each other.

First Aspect

In a first aspect, a conversion device used in a power supply system including: a power supply device in which a first battery unit and a second battery unit are switched between a series connection and a parallel connection; a plurality of first conversion circuits that each convert DC power input to DC ends thereof to AC power and output the AC power to AC ends thereof a plurality of transformers in each of which a first coil that is connected to the AC ends of a corresponding one of the plurality of first conversion circuits is magnetically coupled to a plurality of second coils; and a plurality of capacitors that are each connected to the DC ends of a corresponding one of the plurality of first conversion circuits, the conversion device including: the plurality of first conversion circuits; the plurality of transformers that are connected to the plurality of first conversion circuits in one-to-one correspondence; a plurality of second conversion circuits; and a plurality of third conversion circuits, wherein one of the plurality of second conversion circuits performs a first operation and a second operation, the first operation being an operation of converting AC power generated at one of the plurality of second coils of one of the plurality of transformers to DC power and outputting the DC power to the first battery unit, and the second operation being an operation of converting DC power input from the first battery unit to generate AC power at the one of the plurality of second coils of the one of the plurality of transformers, another one of the plurality of second conversion circuits performs a third operation and a fourth operation, the third operation being an operation of converting AC power generated at one of the plurality of second coils of another one of the plurality of transformers to DC power and outputting the DC power to the second battery unit, and the fourth operation being an operation of converting DC power input from the second battery unit to generate AC power at the one of the plurality of second coils of the other one of the plurality of transformers, one of the plurality of third conversion circuits performs a fifth operation of converting AC power input to another one of the plurality of second coils of the one of the plurality of transformers to DC power and outputting the DC power to a common path, and another one of the plurality of third conversion circuits performs a sixth operation of converting AC power input to another one of the plurality of second coils of the other one of the plurality of transformers to DC power and outputting the DC power to the common path.

With the conversion device according to the first aspect, when there is a difference between the output voltage of the first battery unit and the output voltage of the second battery unit while the first battery unit and the second battery unit are connected in series, the conversion device may perform charging or discharging of the first battery unit and charging or discharging of the second battery unit using different paths. Accordingly, the conversion device can perform an operation of reducing the difference between the output voltages. Moreover, the conversion device can perform the charging or discharging of the first battery unit and the charging or discharging of the second battery unit using different paths while suppressing the influence on the capacitor connected to the DC ends of the first conversion circuit. Accordingly, the conversion device can perform an operation of reducing the difference between the output voltage of the first battery unit and the output voltage of the second battery unit while suppressing the load applied to the capacitors.

Second Aspect

In a second aspect, a conversion device according to the second aspect is obtained by configuring the conversion device according to the first aspect described above to have the following feature. The conversion device according to the second aspect includes: a control device that controls the plurality of second conversion circuits and the plurality of third conversion circuits. When the first battery unit and the second battery unit are connected in series, the control device performs first discharge control that causes the one of the plurality of third conversion circuits to perform the fifth operation while causing the one of the plurality of second conversion circuits to perform the second operation. The control device performs second discharge control that causes the other one of the plurality of third conversion circuits to perform the sixth operation while causing the other one of the plurality of second conversion circuits to perform the fourth operation. The control device adjusts an output current that is output through the first discharge control and an output current that is output through the second discharge control to reduce a difference between an output voltage of the first battery unit and an output voltage of the second battery unit.

The conversion device according to the second aspect described above can separately perform the first discharge control that discharges electric power to the common path based on the electric power from the first battery unit and the second discharge control that discharges electric power to the common path based on the electric power from the second battery unit, and it is therefore possible to separately adjust the discharge current. Also, the conversion device can perform the first discharge control and the second discharge control while suppressing the load applied to the capacitors.

Third Aspect

In a third aspect, a conversion device is obtained by configuring the conversion device according to the first or second aspect described above to have the following feature. The one of the plurality of third conversion circuits performs at least a seventh operation of converting DC power from the common path to AC power and outputting the AC power to the other one of the plurality of second coils of the one of the plurality of transformers. The other one of the plurality of third conversion circuits performs at least an eighth operation of converting the DC power from the common path to AC power and outputting the AC power to the other one of the plurality of second coils of the other one of the plurality of transformers.

The conversion device according to the third aspect described above may also perform a charging operation of supplying electric power to the first battery unit from the common path side via the one of the plurality of third conversion circuits, the one of the plurality of transformers, and the one of the plurality of second conversion circuits. Also, the conversion device may also perform a charging operation of supplying electric power to the second battery unit from the common path side via the other one of the plurality of third conversion circuits, the other one of the plurality of transformers, and the other one of the plurality of second conversion circuits. Also, the conversion device can perform these charging operations while suppressing the load applied to the capacitors.

Fourth Aspect

In a fourth aspect, a conversion device is obtained by configuring the conversion device according to the feature [3] described above to have the following feature. The conversion device according to the fourth aspect includes: a control device that controls the plurality of second conversion circuits and the plurality of third conversion circuits. The control device selectively performs first charge/discharge control and second charge/discharge control. The first charge/discharge control is control that, when the first battery unit and the second battery unit are connected in series, performs both a control operation of causing the one of the plurality of third conversion circuits to perform the fifth operation while causing the one of the plurality of second conversion circuits to perform the second operation and a control operation of causing the other one of the plurality of second conversion circuits to perform the third operation while causing the other one of the plurality of third conversion circuits to perform the eighth operation. The second charge/discharge control is control that performs both a control operation of causing the other one of the plurality of third conversion circuits to perform the sixth operation while causing the other one of the plurality of second conversion circuits to perform the fourth operation and a control operation of causing of the one of the plurality of second conversion circuits to perform the first operation while causing the one of the plurality of third conversion circuits to perform the seventh operation.

The conversion device according to the feature [4] described above can charge the second battery unit based on the electric power from the first battery unit by performing the first charge/discharge control. Also, the conversion device can charge the first battery unit based on the electric power from the second battery unit by performing the second charge/discharge control.

Fifth Aspect

In a fifth aspect, a conversion device is obtained by configuring the conversion device according to any of the first to fourth aspects to have the following feature. The conversion device according to the fifth aspect includes: a control device that controls the plurality of second conversion circuits and the plurality of third conversion circuits. When a difference between an output voltage of the first battery unit and an output voltage of the second battery unit is greater than or equal to a predetermined value, the control device causes the plurality of second conversion circuits and the plurality of third conversion circuits to perform an operation of reducing the difference between the output voltage of the first battery unit and the output voltage of the second battery unit.

With the conversion device according to the fifth aspect described above, when the difference between the output voltage of the first battery unit and the output voltage of the second battery unit is greater than or equal to the predetermined value, the conversion device can perform control to reduce the difference between the output voltages.

Sixth Aspect

In a sixth aspect, a conversion device is obtained by configuring the conversion device according to any of the first to the fifth aspects described above to have the following feature. The conversion device according to the sixth aspect includes: a switching unit that switches the first battery unit and the second battery unit between the series connection and the parallel connection. The switching unit performs switching from the series connection to the parallel connection when the following condition is satisfied: a difference between an output voltage of the first battery unit and an output voltage of the second battery unit is less than a threshold value.

The conversion device according to the sixth aspect described above switches the power supply device from the series connection to the parallel connection when the following condition is satisfied: the difference between the output voltage of the first battery unit and the output voltage of the second battery unit is less than a threshold value, and it is therefore possible to prevent the power supply device from being switched to the parallel connection while the difference between the output voltages is greater than or equal to the threshold value.

Seventh Aspect

In a seventh aspect, a conversion device is obtained by configuring the conversion device according to any of the first to the sixth aspects described above to have the following feature. In the conversion device according to the seventh aspect, a power storage unit is connected to the common path.

The conversion device according to the seventh aspect described above can separately perform an operation of discharging electric power to the power storage unit based on the electric power from the first battery unit and an operation of discharging electric power to the power storage unit based on the electric power from the second battery unit using different paths.

Embodiment 1

FIG. 1 shows a conversion device 10 according to a first embodiment of the present disclosure. The conversion device 10 is configured as a power supply system for a vehicle.

Configuration of Power Supply System

Figure 2:
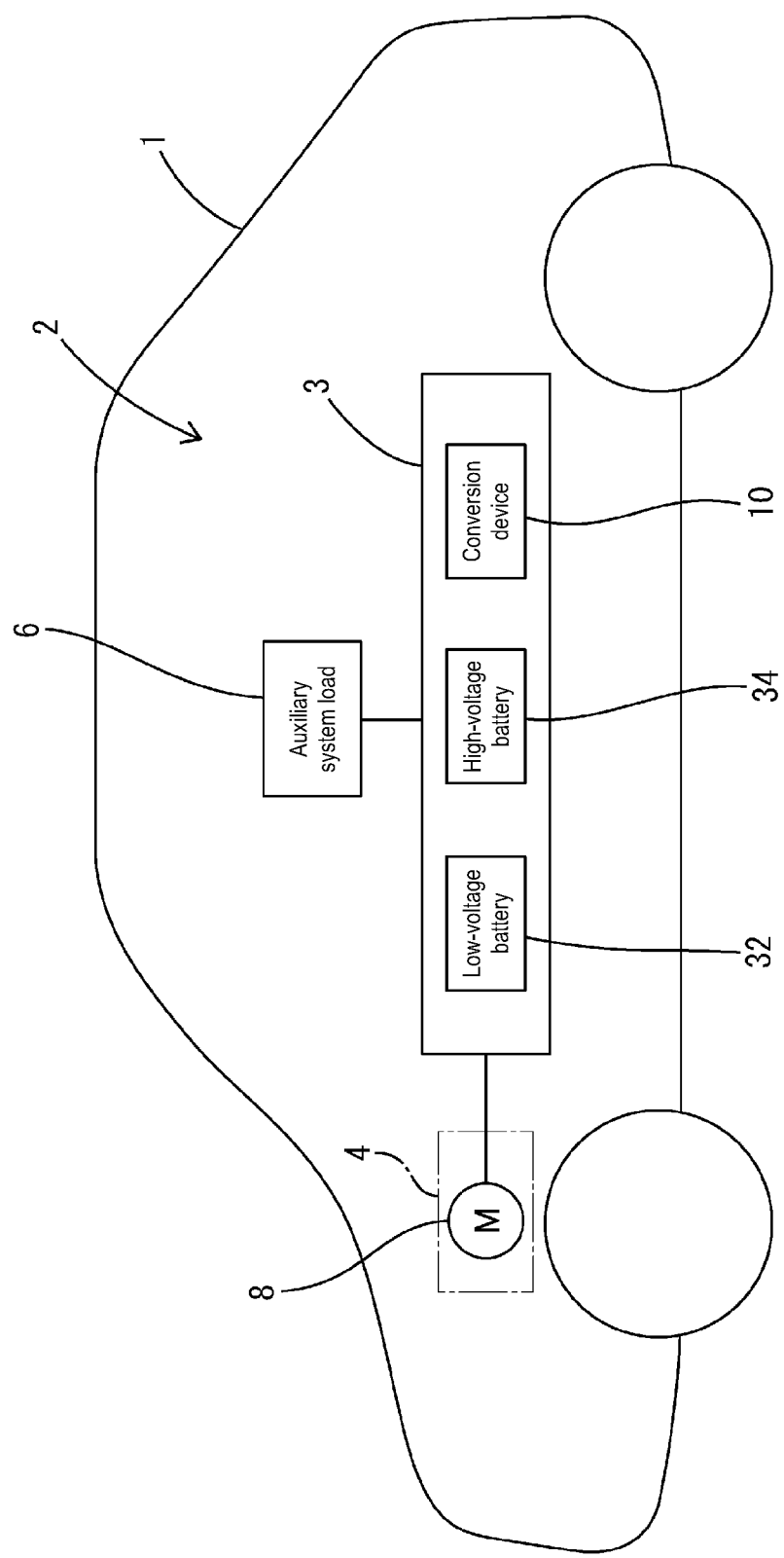
FIG. 2 is a schematic diagram schematically showing an example of a vehicle in which the in-vehicle system shown in FIG. 1 is mounted.

As shown in FIG. 2, the conversion device 10 is used as a part of an in-vehicle system 2 that is mounted in a vehicle 1. The vehicle 1 is a vehicle in which the conversion device 10 is mounted, and may be, for example, a PHEV or an EV. As shown in FIG. 2, the in-vehicle system 2 includes a power supply system 3, a high-voltage load 4, an auxiliary system load 6, and the like. The power supply system 3 includes the conversion device 10, a low-voltage battery 32, and a high-voltage battery 34. The vehicle 1 includes a connection terminal, and an external AC power supply 190 (FIG. 1) may be electrically connected to the connection terminal. As shown in FIG. 1, the conversion device 10 can be switched between a state in which the external AC power supply 190 is electrically connected and a state in which the external AC power supply 190 is not connected.

As shown in FIG. 1, the conversion device 10 includes a power control device 12 and a switch unit 14. The power control device 12 includes a power conversion unit 16 and a control device 18.

The conversion device 10 is a system that can charge the high-voltage battery 34 and the low-voltage battery 32 based on AC power supplied from the external AC power supply 190 when the external AC power supply 190 is connected to the vehicle 1. Also, the conversion device 10 is a system that can supply electric power to the high-voltage load 4 and the auxiliary system load 6 while the vehicle is running.

The high-voltage load 4 shown in FIG. 2 is a load that can operate in response to receiving a supply of electric power from the high-voltage battery 34. The high-voltage load 4 includes, for example, a driving unit 8 and a PCU (Power Control Unit) that is not shown in the diagrams. The PCU is a device that converts electric power output from the high-voltage battery 34 to electric power for driving the driving unit 8, and supplies the electric power to the driving unit 8. The PCU includes, for example, an inverter, and generates AC current (for example, three-phase AC current) from DC current and supplies the generated AC current to the driving unit 8. The driving unit 8 is an electric driving device such as a main system motor. The driving unit 8 is a device that provides a driving force for rotating the wheels of the vehicle 1 based on the electric power supplied from the high-voltage battery 34.

The auxiliary system load 6 is, for example, an auxiliary device required to operate the engine and the motor. The auxiliary device may be, for example, a self-starting motor, an alternator, a radiator cooling fan, or the like. The auxiliary system load 6 may include an electric power steering system, an electric parking brake, lights, a windshield wiper driving unit, a navigation device, and the like.

In the specification of the present application, the expression "while the vehicle is running" encompasses a state in which the vehicle is moving, but is not limited to the state in which the vehicle is moving. The expression "while the vehicle is running" also encompasses a state in which the vehicle can move in response to the accelerator being pressed. The expression "while the vehicle is running" also encompasses a state in which the vehicle is stopped and not moving, with electric power being supplied to any one or all of the components of the auxiliary system load 6. In the case where the vehicle 1 is a PHEV, the expression "while the vehicle is running" also encompasses a state in which the engine is idling.

The high-voltage battery 34 corresponds to an example of the power supply device. The high-voltage battery 34 is a power supply device in which a first battery unit 34A and a second battery unit 34B are switched between a series connection and a parallel connection. The high-voltage battery 34 is configured to be capable of being charged and discharged. The high-voltage battery 34 outputs a high voltage (for example, about 300 V) for driving the driving unit 8. The output voltage of the high-voltage battery 34 when fully charged is higher than the output voltage of the low-voltage battery 32 when fully charged. The high-voltage battery 34 may be a lithium ion battery, or any other types of storage batteries.

The low-voltage battery 32 corresponds to an example of the power storage unit. The low-voltage battery 32 is configured to be capable of being charged and discharged. The low-voltage battery 32 supplies electric power to the auxiliary system load 6. The low-voltage battery 32 may be a lead acid storage battery, or any other types of storage batteries. The low-voltage battery 32 when fully charged outputs a predetermined voltage (for example, 12 V). A high-potential side electrode of the low-voltage battery 32 is electrically connected to a conductive path 62A that is one of conductive paths of a common path 62, and a low-potential side electrode of the low-voltage battery 32 is electrically connected to a conductive path 62B that is the other conductive path of the common path 62.

The control device 18 is a device that performs various control operations to the devices of the in-vehicle system 2. The control device 18 may be composed of a plurality of electronic control devices or a single electronic control device. The control device 18 is a device that can control the power conversion unit 16. Specifically, the control device 18 can control PFC (Power Factor Correction) converters 40 and 50, first conversion circuits 42 and 52, transformers 48 and 58, second conversion circuits 44 and 54, and third conversion circuits 46 and 56.

The switch unit 14 includes a plurality of switches 14A, 14B, and 14C. The switch unit 14 is a switching circuit that switches the first battery unit 34A and the second battery unit 34B between a series connection and a parallel connection. The switch unit 14 switches the first battery unit 34A and the second battery unit 34B to the series connection when the switch 14A is on and the switches 14B and 14C are off. The switch unit 14 switches the first battery unit 34A and the second battery unit 34B to the parallel connection when the switch 14A is off and the switches 14B and 14C are on. The switch unit 14 is controlled by the control device 18. The control device 18 may perform control to switch the switch unit 14: control to turn on the switch 14A and turn off the switches 14B and 14C; and control to turn off the switch 14A and turn on the switches 14B and 14C. The switch unit 14 and the control device 18 correspond to an example of the switching unit.

In the case where the vehicle in which the conversion device 10 is mounted is an EV, the EV can run with the configuration shown in FIGS. 1 and 2. In the case where the vehicle in which the conversion device 10 is mounted is a PHEV, the vehicle includes an engine in addition to the driving unit 8. Accordingly, when the vehicle is a PHEV, the PHEV can run as a result of the engine and the driving unit 8 operating in corporation.

The power conversion unit 16 mainly includes the PFC converters 40 and 50, the first conversion circuits 42 and 52, the transformers 48 and 58, the second conversion circuits 44 and 54, and the third conversion circuits 46 and 56. Furthermore, the power conversion unit 16 includes noise filter units 91, 92, 94, and 96, and the like. The noise filter units 91, 92, 94, and 96 are units that remove noise in the path.

Figure 3:
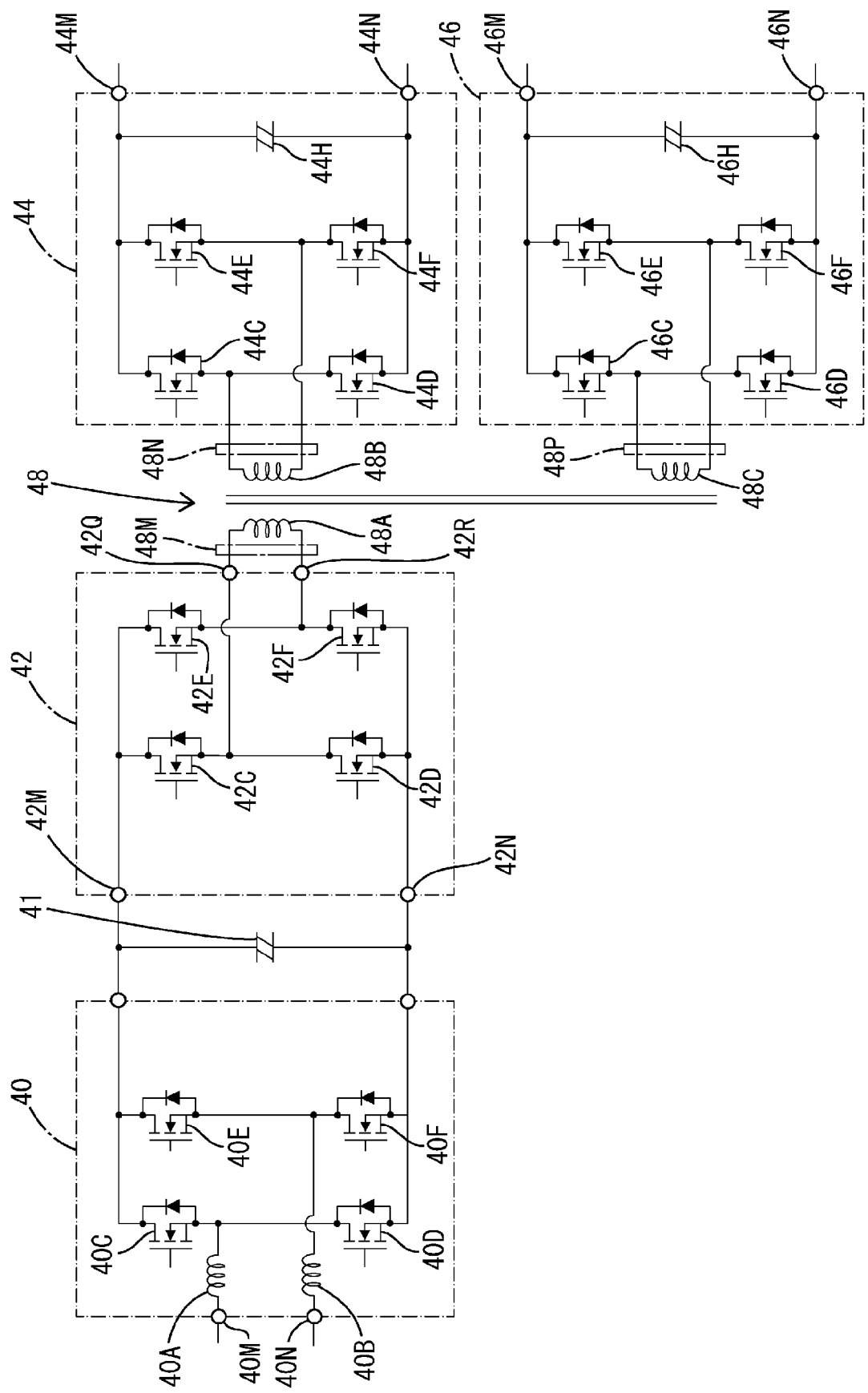
FIG. 3 is a circuit diagram showing an example of a specific configuration of a portion of a power conversion unit included in the power supply system shown in FIG. 1.
Figure 4:
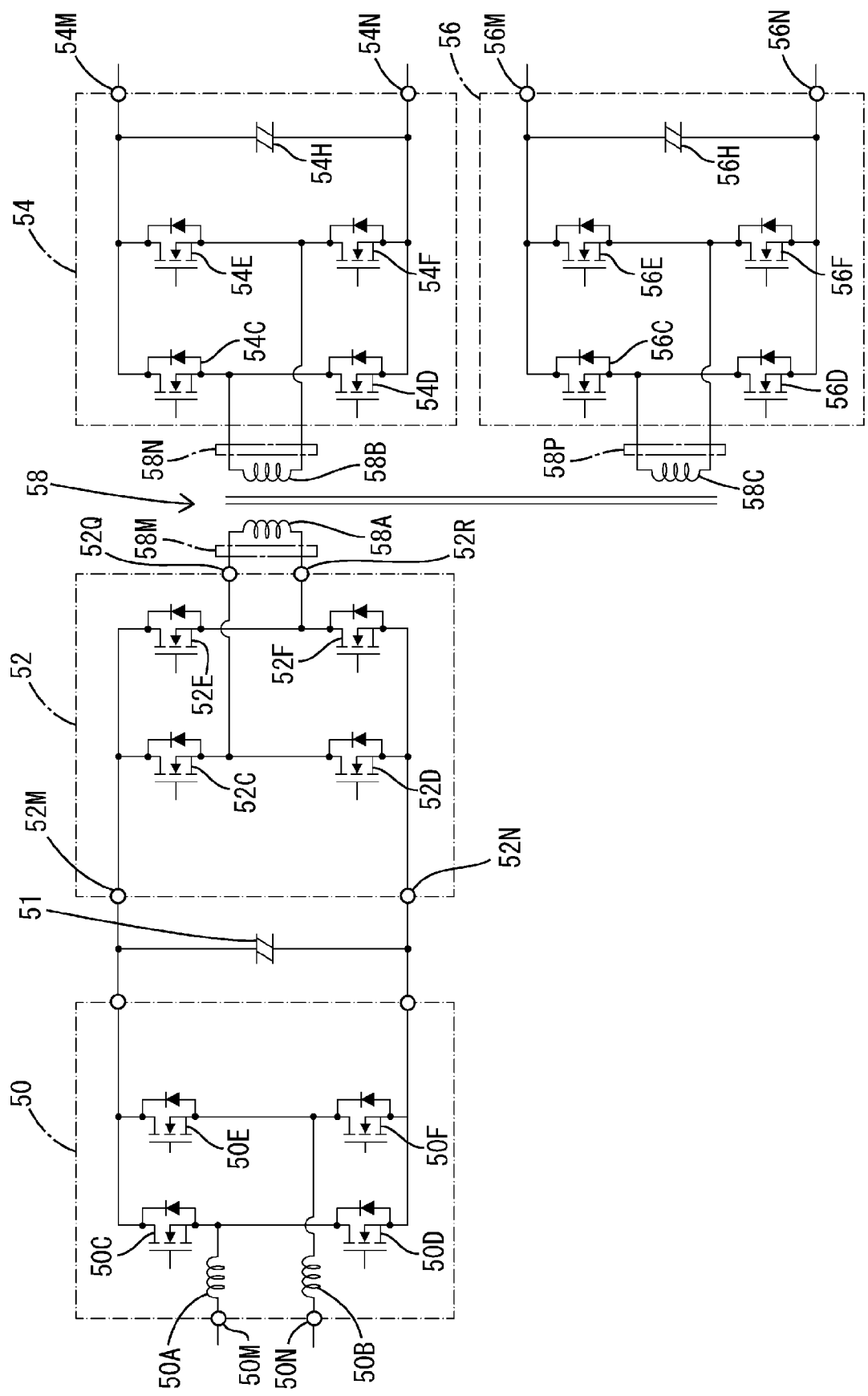
FIG. 4 is a circuit diagram showing an example of a specific configuration of a portion (which is different from the portion shown in FIG. 3) of the power conversion unit included in the power supply system shown in FIG. 1.

The power conversion unit 16 is configured as an in-vehicle charging device. The power conversion unit 16 functions as an OBC (On Board Charger). The power conversion unit 16 may perform an operation of charging the high-voltage battery 34 that functions as a main power supply based on electric power supplied from the external AC power supply 190 (for example, a commercial power supply) that is provided outside of the vehicle 1 when the external AC power supply 190 is connected to the vehicle 1. The power conversion unit 16 may also perform an operation of charging the low-voltage battery 32 based on the electric power supplied from the external AC power supply 190 when the external AC power supply 190 is connected to the vehicle 1. FIGS. 3 and 4 show specific circuits that constitute a part of the power conversion unit 16.

The PFC converters 40 and 50 function as power-factor improvement circuits, and are configured as bidirectional AC/DC converters that convert between AC power and DC power. In FIG. 1, the PFC converters 40 and 50 may also be referred to as "bidirectional AC/DC PFCs". As shown in FIG. 3, the PFC converter 40 includes inductors 40A and 40B, and switch elements 40C, 40D, 40E, and 40F that constitute a full bridge circuit. Two input terminals of the full bridge circuit constituted by the switch elements 40C, 40D, 40E, and 40F are electrically connected to the inductors 40A and 40B. Two output terminals of the full bridge circuit are electrically connected to opposite ends of a capacitor 41. The PFC converter 40 generates DC voltage from AC voltage input from the external AC power supply 190 to terminals 40M and 40N at the time of external charging, and applies the DC voltage to the opposite ends of the capacitor 41. In response to the PFC converter 40 applying the DC voltage across the opposite ends of the capacitor 41, the DC voltage is applied between terminals 42M and 42N of the first conversion circuit 42.

As shown in FIG. 4, the PFC converter 50 has the same configuration as the PFC converter 40. The PFC converter 50 includes inductors 50A and 50B and switch elements 50C, 50D, 50E, and 50F. Two input terminals of a full bridge circuit constituted by the switch elements 50C, 50D, 50E, and 50F are electrically connected to the inductors 50A and 50B, respectively. The PFC converter 40 generates DC voltage from AC voltage input from the external AC power supply 190 to terminals 50M and 50N at the time of external charging, and applies the DC voltage across opposite ends of a capacitor 51 and across terminals 52M and 52N of the first conversion circuit 52.

As shown in FIG. 3, the capacitor 41 is electrically connected to the terminals 42M and 42N that correspond to an example of the DC ends of the first conversion circuit 42. One electrode of the capacitor 41 is electrically connected to the terminal 42M, and the other electrode of the capacitor 41 is electrically connected to the terminal 42N.

As shown in FIG. 4, the capacitor 51 is electrically connected to the terminals 52M and 52N that correspond to an example of the DC ends of the first conversion circuit 52. One electrode of the capacitor 51 is electrically connected to the terminal 52M, and the other electrode of the capacitor 51 is electrically connected to the terminal 52N.

The first conversion circuits 42 and 52 function as DC/AC inverter circuits. In FIG. 1, the first conversion circuits 42 and 52 may also be referred to as "DC/AC full bridge circuits 42 and 52". The first conversion circuit 42 functions as a power conversion circuit that converts DC power input from the PFC converter 40 to AC power and outputs the AC power. As shown in FIG. 3, the first conversion circuit 42 includes switch elements 42C, 42D, 42E, and 42F that constitute a full bridge circuit. A terminal 42Q that is one of two output terminals of the full bridge circuit configured by the switch elements 42C, 42D, 42E, and 42F is electrically connected to one of end portions 48M (opposite ends of a coil 48A) of a first transformer 48. A terminal 42R that is the other one of the two output terminals is electrically connected to the other of the end portions 48M. The terminals 42Q and 42R correspond to an example of the AC ends of the first conversion circuit 42. The first conversion circuit 42 converts DC voltage input from the PFC converter 40 to the terminals 42M and 42N to AC voltage, and outputs the AC voltage from the terminals 42Q and 42R to apply the AC voltage to the first coil 48A of the transformer 48.

As shown in FIG. 4, the first conversion circuit 52 has the same configuration as the first conversion circuit 42. In the first conversion circuit 52, an output terminal 52Q that is one of output terminals of a full bridge circuit constituted by switch elements 52C, 52D, 52E, and 52F is electrically connected to one end portion of a first coil 58A of a transformer 58, and a terminal 52R that is the other output terminal of the full bridge circuit is electrically connected to the other end portion of the coil 58A. The terminals 52Q and 52R correspond to an example of the AC ends of the first conversion circuit 52. The first conversion circuit 52 converts DC voltage input from the PFC converter 50 to the terminals 52M and 52N to AC voltage, and outputs the AC voltage from the terminals 52Q and 52R to apply the AC voltage to the first coil 58A of the transformer 58.

As shown in FIGS. 3 and 4, the plurality of transformers 48 and 58 are connected to the plurality of first conversion circuits 42 and 52, respectively. As shown in FIG. 3, the transformer 48 includes a first coil 48A and a plurality of second coils 48B and 48C. The first coil 48A is a coil that is electrically connected to the AC ends of the first conversion circuit 42. The first coil 48A and the plurality of second coils 48B and 48C are magnetically coupled. In the description given below, the transformer 48 may also be referred to as "the transformer 48 that corresponds to the one of the plurality of transformers". The second coil 48B may also be referred to as "the second coil 48B that corresponds to the one of the plurality of second coils". The second coil 48C may also be referred to as "the second coil 48C that corresponds to the other one of the plurality of second coils".

As shown in FIG. 4, the transformer 58 includes the first coil 58A and a plurality of second coils 58B and 58C. The first coil 58A is a coil that is electrically connected to the AC ends of the first conversion circuit 52. The first coil 58A and the plurality of second coils 58B and 58C are magnetically coupled. In the description given below, the transformer 58 may also be referred to as "the transformer 58 that corresponds to the other one of the plurality of transformers". The second coil 58B may also be referred to as "the second coil 58B that corresponds to the one of the plurality of second coils". The second coil 58C may also be referred to as "the second coil 58C that corresponds to the other one of the plurality of second coils".

The second conversion circuits 44 and 54 function as bidirectional AC/DC converters, and have the function of bidirectionally converting between AC power and DC power. In FIG. 1, the second conversion circuits 44 and 54 may also be referred to as "AC/DC full bridge circuits 44 and 54".

The second conversion circuit 44 corresponds to an example of the one of the plurality of second conversion circuits, and may also be referred to as "the second conversion circuit 44 that corresponds to the one of the plurality of second conversion circuits". The second conversion circuit 44 includes switch elements 44C, 44D, 44E, and 44F that constitute a full bridge circuit and a capacitor 44H. One of a pair of terminals of the full bridge circuit constituted by the switch elements 44C, 44D, 44E, and 44F is electrically connected to one end of the second coil 48B, and the other terminal is electrically connected to the other end of the second coil 48B. The second conversion circuit 44 may perform a first operation of converting AC power generated at the second coil 48B of the transformer 48 to DC power, and outputting the DC power to the first battery unit 34A. In the first operation, the output voltage (AC voltage) applied to end portions 48N (opposite ends of the coil 48B) of the transformer 48 is converted to DC voltage, and the DC voltage is applied to terminals 44M and 44N. The terminal 44M serves as a conductive path that may be electrically connected to an electrode of the first battery unit 34A that has the highest potential. The terminal 44N serves as a conductive path that may be electrically connected to an electrode of the first battery unit 34A that has the lowest potential. A relay or a fuse (not shown) may be provided between each of the terminals 44M and 44N and the first battery unit 34A. The second conversion circuit 44 may also perform a second operation of converting the DC power input from the first battery unit 34A to generate AC power at the second coil 48B of the transformer 48. In the second operation, the DC voltage applied to the terminals 44M and 44N is converted to AC voltage, and the AC voltage is applied to the second coil 48B of the transformer 48.

The second conversion circuit 54 corresponds to an example of the other one of the plurality of second conversion circuits, and may also be referred to as "the second conversion circuit 54 that corresponds to the other one of the plurality of second conversion circuits". The second conversion circuit 54 has the same circuit configuration as the second conversion circuit 44. The second conversion circuit 54 includes switch elements 54C, 54D, 54E, and 54F that constitute a full bridge circuit and a capacitor 54H. One of a pair of terminals of the full bridge circuit constituted by the switch elements 54C, 54D, 54E, and 54F is electrically connected to one end of the second coil 58B, and the other terminal is electrically connected to the other end of the second coil 58B. The second conversion circuit 54 may perform a third operation of converting AC voltage generated at the second coil 58B of the transformer 58 to DC power and outputting the DC power to the second battery unit 34B. In the third operation, the output voltage (AC voltage) applied to end portions 58N (opposite ends of the coil 58B) of the transformer 58 is converted to DC voltage, and the DC voltage is applied to terminals 54M and 54N. The terminal 54M serves as a conductive path that may be electrically connected to an electrode of the second battery unit 34B that has the highest potential, and the terminal 54N serves as a conductive path that may be electrically connected to an electrode of the second battery unit 34B that has the lowest potential. A relay or a fuse (not shown) may be provided between each of the terminals 54M and 54N and the second battery unit 34B. The second conversion circuit 54 may also perform a fourth operation of converting DC power input from the second battery unit 34B to generate AC power at the second coil 58B of the transformer 58. In the fourth operation, the DC voltage applied to the terminals 54M and 54N is converted to AC voltage, and the AC voltage is applied to the second coil 58B of the transformer 58.

The third conversion circuits 46 and 56 function as bidirectional AC/DC converters, and have the function of bidirectionally converting between AC power and DC power. In FIG. 1, the third conversion circuits 46 and 56 may also be referred to as "AC/DC full bridge circuits 46 and 56".

The third conversion circuit 46 corresponds to an example of the one of the plurality of third conversion circuits, and may also be referred to as "the third conversion circuit 46 that corresponds to the one of the plurality of third conversion circuits". The third conversion circuit 46 includes switch elements 46C, 46D, 46E, and 46F that constitute a full bridge circuit and a capacitor 46H. One of a pair of terminals of the full bridge circuit constituted by the switch elements 46C, 46D, 46E, and 46F is electrically connected to one end of the second coil 48C, and the other terminal is electrically connected to the other end of the second coil 48C. The third conversion circuit 46 may perform a fifth operation of converting AC power generated at the second coil 48C of the transformer 48 to DC power and outputting the DC power to the common path 62. In the fifth operation, the output voltage (AC voltage) applied to end portions 48P (opposite ends of the coil 48C) of the transformer 48 is converted to DC voltage, and the DC voltage is applied to terminals 46M and 46N. The terminal 46M is a terminal that is electrically connected to the conductive path 62A that is the one of the conductive paths of the common path 62, and electrically connected to an electrode of the low-voltage battery 32 that has the highest potential. The terminal 46N is a terminal that is electrically connected to the conductive path 62B that is the other conductive path of the common path 62, and electrically connected to an electrode of the low-voltage battery 32 that has the lowest potential. A relay or a fuse (not shown) may be provided between each of the terminals 46M and 46N and the low-voltage battery 32. The third conversion circuit 46 may perform a seventh operation of converting DC power input to the common path 62 to generate AC power at the second coil 48C of the transformer 48. In the seventh operation, the DC voltage applied to the terminals 46M and 46N is converted to AC voltage, and the AC voltage is applied to the second coil 48C of the transformer 48.

The third conversion circuit 56 corresponds to an example of the other one of the plurality of third conversion circuits, and may also be referred to as "the third conversion circuit 56 that corresponds to the other one of the plurality of third conversion circuits". The third conversion circuit 56 has the same circuit configuration as the third conversion circuit 46. The third conversion circuit 56 includes switch elements 56C, 56D, 56E, and 56F that constitute a full bridge circuit and a capacitor 56H. One of a pair of terminals of the full bridge circuit constituted by the switch elements 56C, 56D, 56E, and 56F is electrically connected to one end of the second coil 58C, and the other terminal is electrically connected to the other end of the second coil 58C. The third conversion circuit 56 may perform a sixth operation of converting AC power generated at the second coil 58C of the transformer 58 to DC power and outputting the DC power to the common path 62. In the sixth operation, the output voltage (AC voltage) applied to end portions 58P (opposite ends of the coil 58C) of the transformer 58 is converted to DC voltage, and the DC voltage is applied to terminals 56M and 56N. The terminal 56M is a terminal that is electrically connected to the conductive path 62A that is the one of the conductive paths of the common path 62, and electrically connected to an electrode of the low-voltage battery 32 that has the highest potential. The terminal 56N is a terminal that is electrically connected to the conductive path 62B that is the other conductive path of the common path 62, and serves as a conductive path that may be electrically connected to an electrode of the low-voltage battery 32 that has the lowest potential. A relay or a fuse (not shown) may be provided between each of the terminals 56M and 56N and the low-voltage battery 32. The third conversion circuit 56 may also perform an eighth operation of converting DC power applied to the common path 62 to generate AC power at the second coil 58C of the transformer 58. In the eighth operation, the DC voltage applied to the terminals 56M and 56N is converted to AC voltage, and the AC voltage is applied to the second coil 58C of the transformer 58.

Basic Operation of External Charging

Next is a description of an external changing operation performed in the conversion device 10. At the time of external charging, the conversion device 10 may be electrically connected to the external AC power supply 190, which is a power supply provided outside of the vehicle, via a cable or the like (not shown). When the external AC power supply 190 is connected to the vehicle 1 (FIG. 2), and the external AC power supply 190 and the conversion device 10 are electrically connected, electric power is supplied, for example, from the low-voltage battery 32 to the control device 18. Detection of the electrical connection of the external AC power supply 190 to the conversion device 10 and control of the supply of electric power to the control device 18 are performed by a control device (not shown) that is different from the control device 18.

Figure 5:
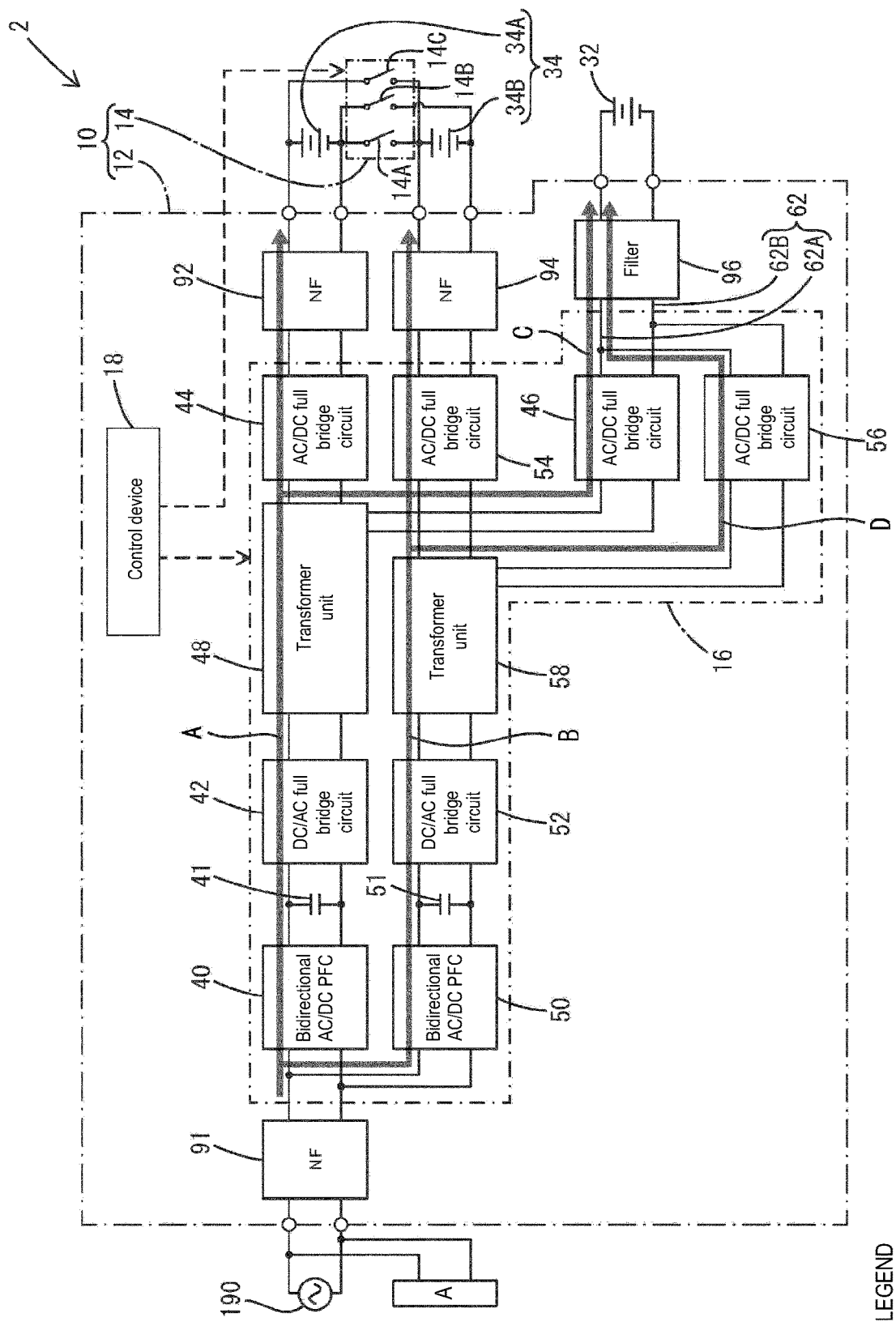
FIG. 5 is an illustrative diagram illustrating an example of an external charging operation performed in the power supply system shown in FIG. 1.

When a supply of electric power to the control device 18 starts in response to a connection of the external AC power supply 190, the control device 18 causes the power conversion unit 16 to operate. Specifically, the control device 18 causes each of the PFC converter 40, the first conversion circuit 42, and the second conversion circuit 44 to perform a power conversion operation such that the AC voltage from the external AC power supply 190 is converted to a high DC voltage and the DC voltage is supplied to the first battery unit 34A. As described above, when the power conversion operation (a conversion operation in a first path) has been performed in a path between the PFC converter 40, the first conversion circuit 42, and the second conversion circuit 44, the first battery unit 34A is charged based on the electric power from the external AC power supply 190 (see arrow A shown in FIG. 5). Furthermore, the control device 18 causes each of the PFC converter 50, the first conversion circuit 52, and the second conversion circuit 54 to perform a power conversion operation such that the AC voltage from the external AC power supply 190 is converted to a high DC voltage, and the DC voltage is supplied to the second battery unit 34B. As described above, when the power conversion operation (a conversion operation in a second path) has been performed in a path between the PFC converter 50, the first conversion circuit 52, and the second conversion circuit 54, the second battery unit 34B is charged based on the electric power from the external AC power supply 190 (see arrow B shown in FIG. 5).

At the time of external charging during which the high-voltage battery 34 is charged based on the electric power from the external AC power supply 190, the first battery unit 34A is charged through the conversion operation in the first path when the first battery unit 34A and the second battery unit 34B are connected in series. Also, the second battery unit 34B is charged through the conversion operation in the second path. The control device 18 can perform control to increase or decrease an output current that is supplied to the first battery unit 34A through the conversion operation in the first path. The control device 18 can also perform control to increase or decrease an output current that is supplied to the second battery unit 34B through the conversion operation in the second path. That is, the control device 18 can separately control the output current supplied to the first battery unit 34A and the output current supplied to the second battery unit 34B.

When the first battery unit 34A and the second battery unit 34B are connected in parallel, the first battery unit 34A and the second battery unit 34B are charged according to either one or both of the conversion operation in the first path and the conversion operation in the second path. The charging of the high-voltage battery 34 when the series connection described above is made in the high-voltage battery 34 can be performed when a first charging condition is established (for example, when the voltage of the external AC power supply 190 is a relatively high voltage of 800 V). Also, the charging of the high-voltage battery 34 when the parallel connection described above is made in the high-voltage battery 34 can be performed when a second charging condition is established (for example, when the voltage of the external AC power supply 190 is a relatively low voltage of 400 V).

At the time of external charging described above, it is also possible to charge the low-voltage battery 32. In this case, the control device 18 may cause the PFC converter 40, the first conversion circuit 42, and the third conversion circuit 46 to perform a power conversion operation (a conversion operation in a third path) such that the AC voltage from the external AC power supply 190 is converted to a low DC voltage, and the DC voltage is supplied to the low-voltage battery 32 (see arrow C shown in FIG. 5). Alternatively, the control device 18 may cause the PFC converter 50, the first conversion circuit 52, and the third conversion circuit 56 to perform the power conversion operation (the conversion operation in the third path) such that the AC voltage from the external AC power supply 190 is converted to a low DC voltage, and the DC voltage is supplied to the low-voltage battery 32 (see arrow D shown in FIG. 5).

Normal Operation During Series Connection

Figure 6:
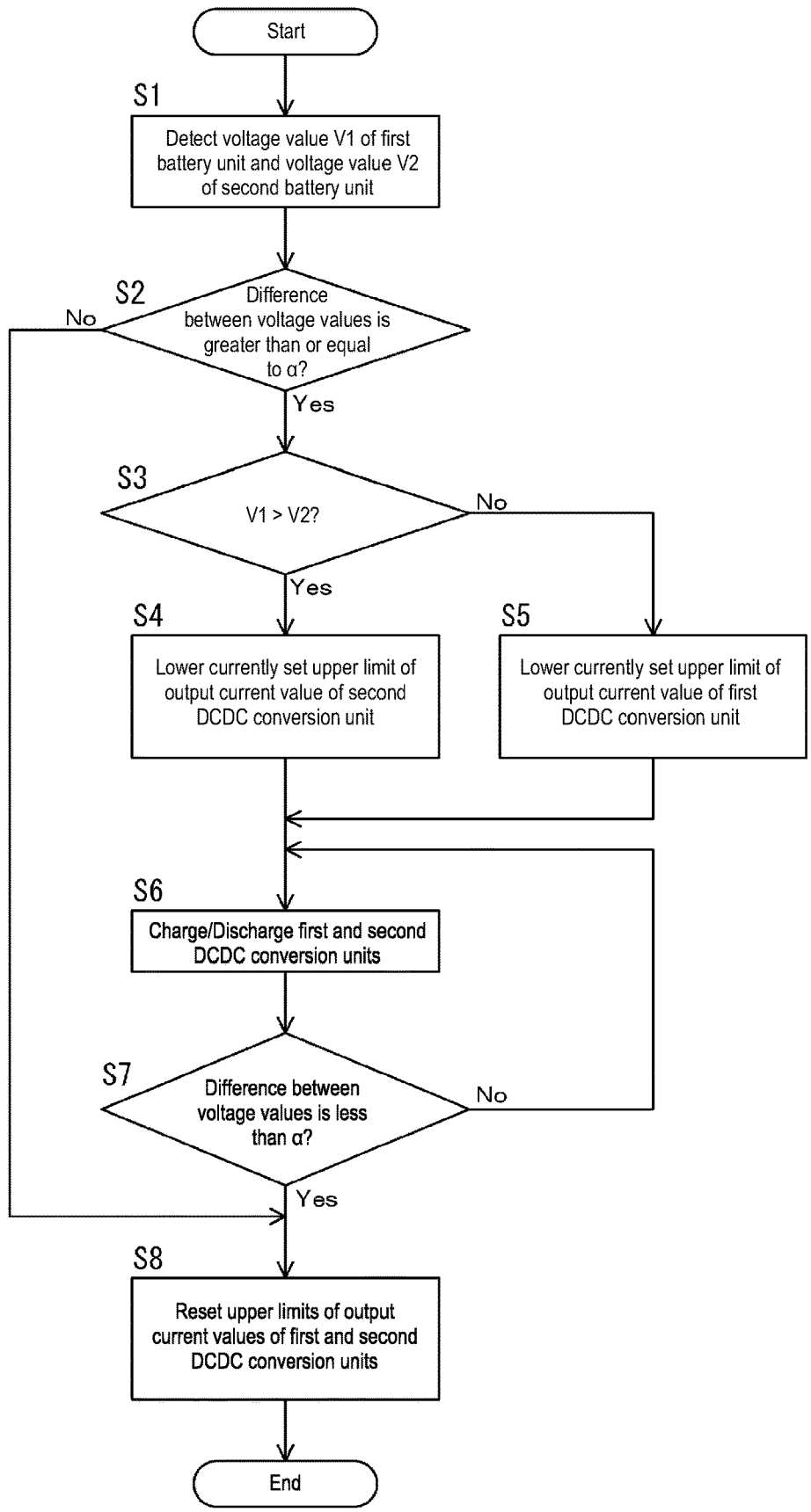
FIG. 6 is a flowchart showing an example of a flow of voltage value difference adjustment control performed by a control device.

The control device 18 can perform voltage value difference adjustment control shown in FIG. 6 when the series connection described above is made in the high-voltage battery 34. For example, the control device 18 may repeatedly perform the control shown in FIG. 6 during operation of the vehicle in which a starting switch of the vehicle is on (for example, while the vehicle is running). Alternatively, the control device 18 may start the control shown in FIG. 6 when the external AC power supply 190 and the conversion device 10 are electrically connected.

When the control shown in FIG. 6 starts, in step S1, the control device 18 detects an output voltage value V1 of the first battery unit 34A and an output voltage value V2 of the second battery unit 34B. The output voltage value V1 and the output voltage value V2 can be detected using any output voltage detection method for an in-vehicle battery. After step S1, in step S2, the control device 18 determines whether or not the difference between the output voltage value V1 and the output voltage value V2 is greater than or equal to a predetermined value $\alpha$. If it is determined in step S2 that the difference between the output voltage value V1 and the output voltage value V2 is greater than or equal to the predetermined value $\alpha$, in step S3, the control device 18 determines whether or not the output voltage value V1 is greater than the output voltage value V2.

If it is determined that the output voltage value V1 is greater than the output voltage value V2, in step S4, the control device 18 lowers the currently set upper limit of the output current value of a second DCDC conversion unit while maintaining the currently set upper limit of the output current value of a first DCDC conversion unit. The first DCDC conversion unit is a conversion unit that is constituted by the second conversion circuit 44, the transformer 48, and the third conversion circuit 46, and performs charging and discharging of the first battery unit 34A. The second DCDC conversion unit is a conversion unit that is constituted by the second conversion circuit 54, the transformer 58, and the third conversion circuit 56, and performs charging and discharging of the second battery unit 34B. As the output current values as used herein, the current value of electric current that flows from the third conversion circuit 46 to the low-voltage battery 32 is a positive output current value of the first DCDC conversion unit, and the current value of electric current that flows from the low-voltage battery 32 to the third conversion circuit 46 is a negative output current value of the first DCDC conversion unit. Also, the current value of electric current that flows from the third conversion circuit 56 to the low-voltage battery 32 is a positive output current value of the second DCDC conversion unit, and the current value of electric current that flows from the low-voltage battery 32 to the third conversion circuit 56 is a negative output current value of the second DCDC conversion unit. When the currently set upper limit of the output current value of the first DCDC conversion unit is lowered while maintaining the currently set upper limit of the output current value of the second DCDC conversion unit, the charging voltage of the first battery unit 34A and the charging voltage of the second battery unit 34B are adjusted such that the output voltage value V2 approaches the output voltage value V1.

Figure 7:
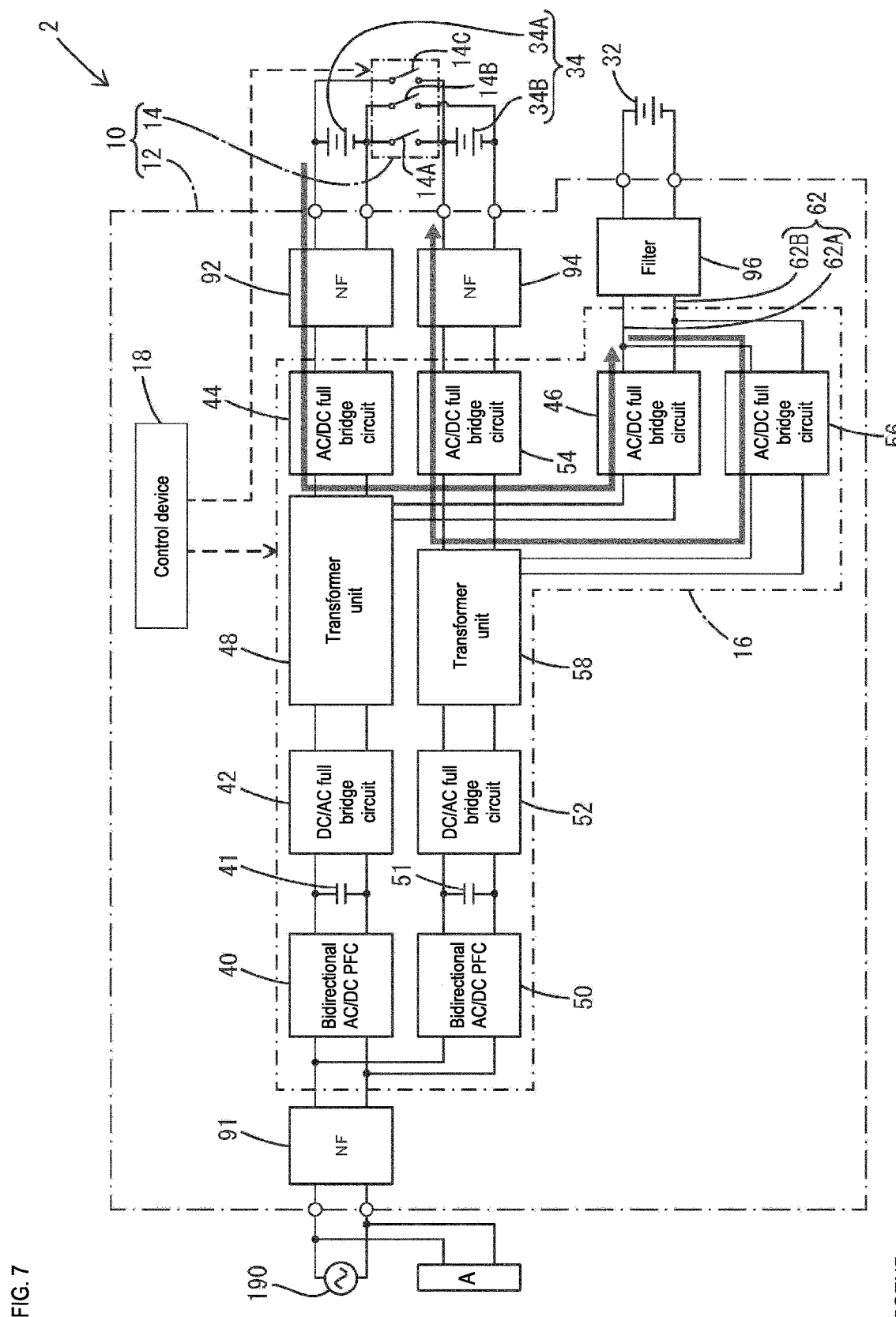
FIG. 7 is an illustrative diagram illustrating a state in which first charge/discharge control is performed in the power supply system shown in FIG. 1.

In step S6 performed after step S4, the control device 18 may perform both a control operation of causing the third conversion circuit 46 to perform the fifth operation while causing the second conversion circuit 44 to perform the second operation and a control operation of causing the second conversion circuit 54 to perform the third operation while causing the third conversion circuit 56 to perform the eighth operation. As described above, when the first charge/discharge control is performed, as shown in FIG. 7, in the first DCDC conversion unit, a control operation of supplying DC power to the common path 62 based on the electric power from the first battery unit 34A is performed. Also, in the second DCDC conversion unit, a control operation of supplying DC power to the second battery unit 34B based on the electric power from the common path 62 is performed.

Figure 8:
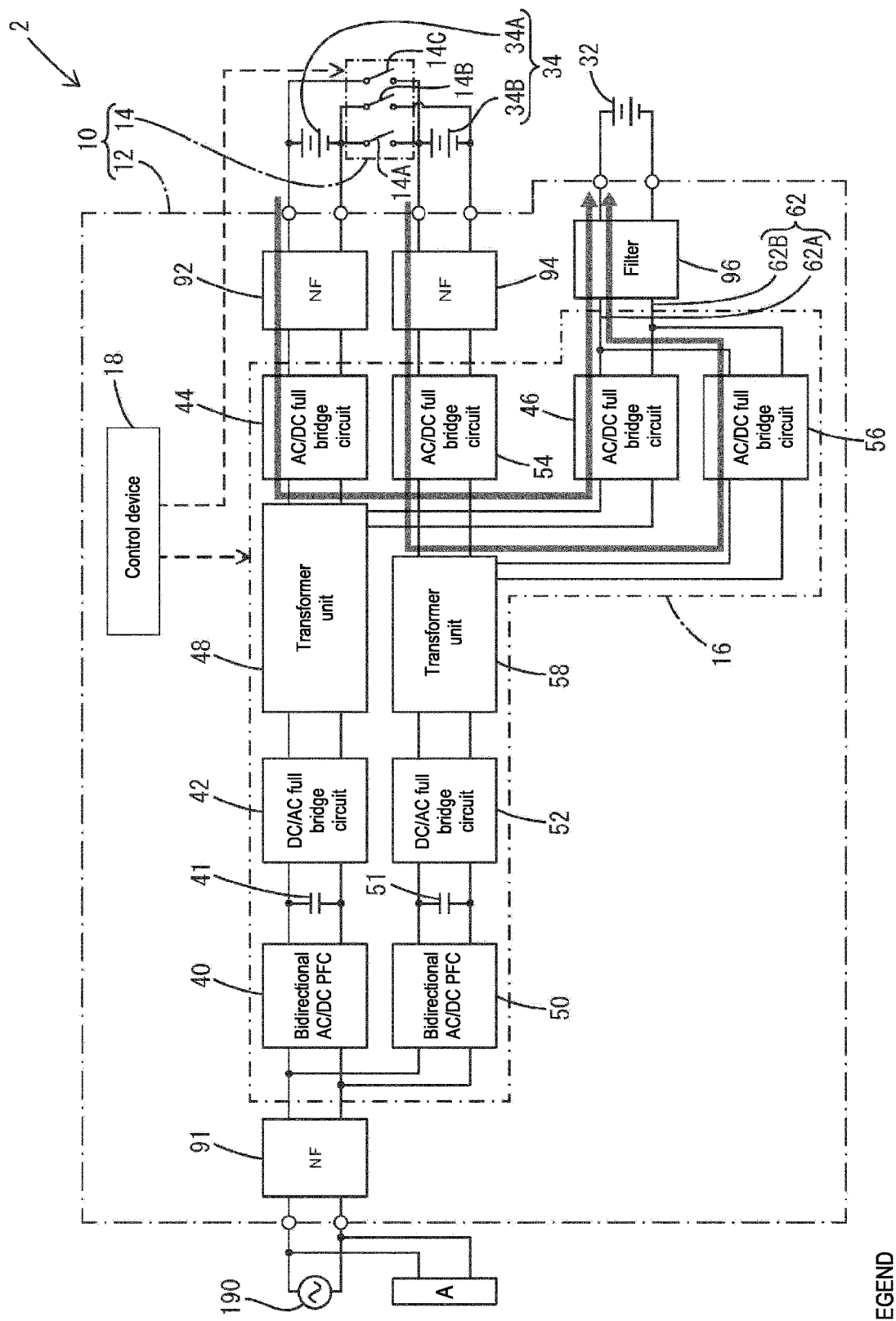
FIG. 8 is an illustrative diagram illustrating a state in which both first discharge control and second discharge control are performed in the power supply system shown in FIG. 1.

In step S6 performed after step S4, the control device 18 may perform both first discharge control that causes the third conversion circuit 46 to perform the fifth operation while causing the second conversion circuit 44 to perform the second operation and second discharge control that causes the third conversion circuit 56 to perform the sixth operation while causing the second conversion circuit 54 to perform the fourth operation. In this case, as shown in FIG. 8, in the first DCDC conversion unit, control that supplies DC power to the common path 62 based on the electric power from the first battery unit 34A is performed. Also, in the second DCDC conversion unit, control that supplies DC power to the common path 62 based on the electric power from the second battery unit 34B is performed. In this case, the electric current output to the common path 62 by the first DCDC conversion unit may be increased to be larger than the electric current output to the common path 62 by the second DCDC conversion unit. That is, the control device 18 adjusts the output current that is output through the first discharge control and the output current that is output through the second discharge control, and it is thereby possible to reduce the difference between the output voltage of the first battery unit 34A and the output voltage of the second battery unit 34B.

If it is determined in step S3 that the output voltage value V1 is less than or equal to the output voltage value V2, in step S5, the control device 18 lowers the currently set upper limit of the output current value of the first DCDC conversion unit while maintaining the currently set upper limit of the output current value of the second DCDC conversion unit. When the currently set upper limit of the output current value of the second DCDC conversion unit is lowered while maintaining the currently set upper limit of the output current value of the first DCDC conversion unit, the charging voltage of the first battery unit 34A and the charging voltage of the second battery unit 34B are adjusted such that the output voltage value V2 approaches the output voltage value V1.

Figure 9:
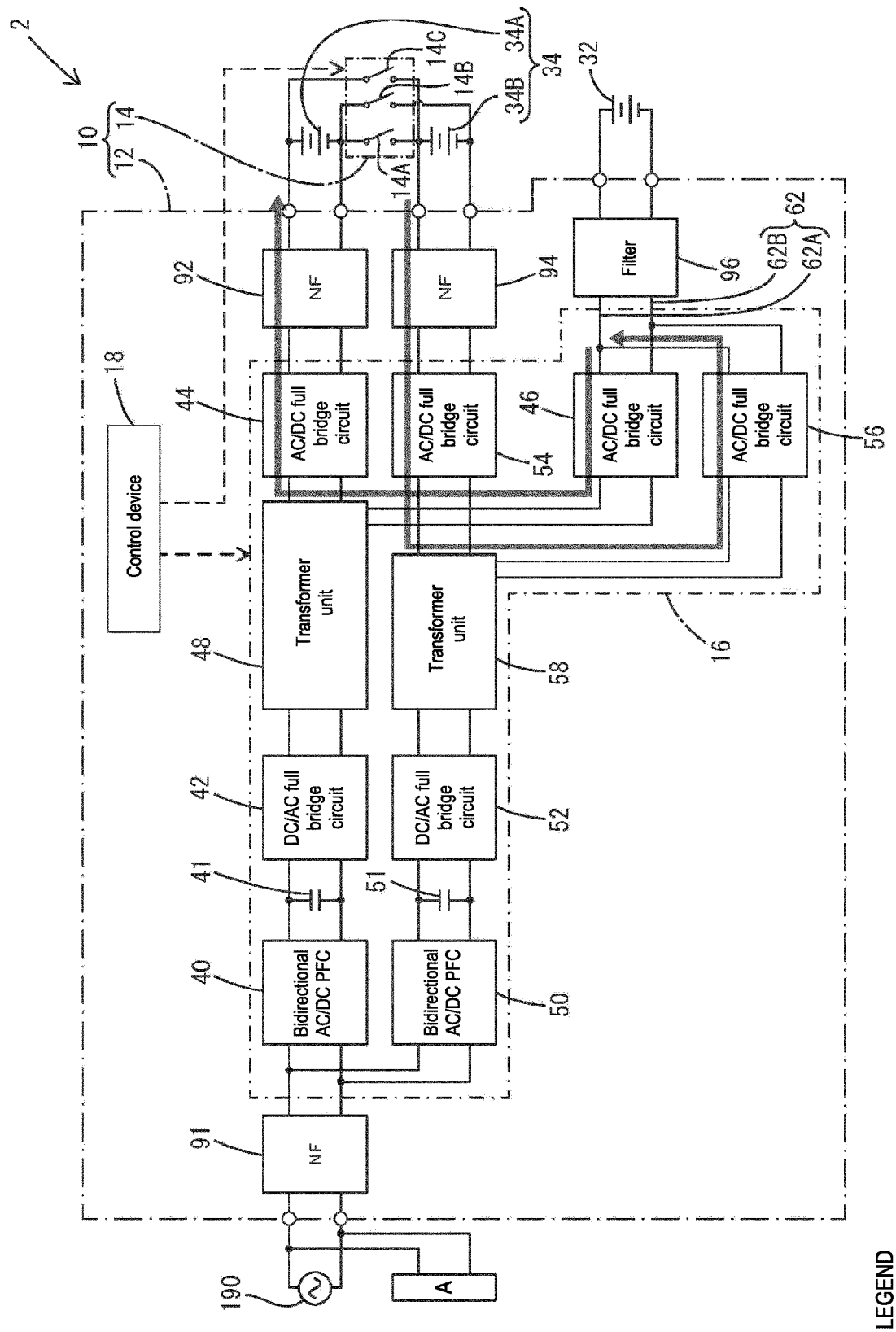
FIG. 9 is an illustrative diagram illustrating a state in which second charge/discharge control is performed in the power supply system shown in FIG. 1.

In step S6 performed after step S5, the control device 18 may perform both control that causes the third conversion circuit 56 to perform the sixth operation while causing the second conversion circuit 54 to perform the fourth operation and control that causes the second conversion circuit 44 to perform the first operation while causing the third conversion circuit 46 to perform the seventh operation. As described above, when second charge/discharge control is performed, as shown in FIG. 9, in the second DCDC conversion unit, control that supplies DC power to the common path 62 based on the electric power from the second battery unit 34B is performed. Also, in the first DCDC conversion unit, control that supplies DC power to the first battery unit 34A based on the electric power from the common path 62 is performed.

In step S6 performed after step S5, the control device 18 may perform both first discharge control that causes the third conversion circuit 46 to perform the fifth operation while causing the second conversion circuit 44 to perform the second operation and second discharge control that causes the third conversion circuit 56 to perform the sixth operation while causing the second conversion circuit 54 to perform the fourth operation. In this case, as shown in FIG. 8, in the first DCDC conversion unit, control that supplies DC power to the common path 62 based on the electric power from the first battery unit 34A is performed. Also, in the second DCDC conversion unit, control that supplies DC power to the common path 62 based on the electric power from the second battery unit 34B is performed. In this case, the electric current output to the common path 62 by the first DCDC conversion unit may be reduced to be smaller than the electric current output to the common path 62 by the second DCDC conversion unit. That is, the control device 18 adjusts the output current that is output through the first discharge control and the output current that is output through the second discharge control, and it is thereby possible to reduce the difference between the output voltage of the first battery unit 34A and the output voltage of the second battery unit 34B.

As described above, if it is determined that the difference between the output voltage of the first battery unit 34A value and the output voltage of the second battery unit 34B value is greater than or equal to the predetermined value α, the control device 18 causes the plurality of second conversion circuits 44 and 54 and the plurality of third conversion circuits 46 and 56 to perform an operation of reducing the difference between the output voltage values.

The control device 18 continues the control in step S6 performed after step S4 or the control in step S6 performed after step S5 until the difference between the output voltage value V1 and the output voltage value V2 reaches a value less than the predetermined value α. When the difference between the output voltage value V1 and the output voltage value V2 reaches a value less than the predetermined value α, the upper limit of the current value set in step S4 or step S5 is reset.

Operation of Switching to Parallel Connection

The control device 18 may start the control shown in FIG. 6 when a "predetermined condition for switching the high-voltage battery 34 from the series connection to the parallel connection" is established while the high-voltage battery 34 is in the series connection. In this case as well, the control shown in FIG. 6 is performed in the same flow described above. There is no particular limitation on the "predetermined condition for switching the high-voltage battery 34 from the series connection to the parallel connection". However, the predetermined condition may be, for example, that charging is performed using a predetermined charging method (in which charging is performed based on the external AC power supply 190 with an output of 400 V). In this case, when the processing in steps S1 to S8 of the control shown in FIG. 6 has been finished, the control device 18 may switch the switch unit 14 to a parallel connection after step S8.

In this case, the control device 18 and the switch unit 14 that correspond to an example of the switching unit switch the high-voltage battery 34 from the series connection to the parallel connection when the following condition is satisfied: the difference between the output voltage of the first battery unit and the output voltage of the second battery unit is less than the threshold value (predetermined value α).

Operation of Switching to Series Connection

When a predetermined condition for switching the high-voltage battery 34 from the series connection to the parallel connection is established, the control device 18 turns on the switch 14A and turn off the switches 14B and 14C to connect the first battery unit 34A and the second battery unit 34B in series. There is no particular limitation on the "predetermined condition for switching the high-voltage battery 34 from the parallel connection to the series connection". However, the predetermined condition may be, for example, that charging is performed using a predetermined charging method (in which charging is performed based on the external AC power supply 190 with an output of 800 V), or that external charging has been finished while high-voltage battery 34 is in the parallel connection.

Next is a description of the advantage effects of the first embodiment.

The conversion device 10 may perform charging or discharging of the first battery unit 34A and charging or discharging of the second battery unit 34B using different paths when there is a difference between the output voltage of the first battery unit 34A and the output voltage of the second battery unit 34B. Accordingly, the conversion device 10 can perform an operation of reducing the difference between the output voltages. Moreover, the conversion device 10 can perform the charging or discharging of the first battery unit 34A and the charging or discharging of the second battery unit 34B using different paths while suppressing the influence on the capacitors 41 and 51 connected to the DC ends of the first conversion circuits 42 and 52. Accordingly, the conversion device 10 can perform an operation of reducing the difference between the output voltage of the first battery unit 34A and the output voltage of the second battery unit 34B while suppressing the load applied to the capacitors 41 and 51.

The conversion device 10 can separately perform the first discharge control that discharges electric power to the common path 62 based on the electric power from the first battery unit 34A and the second discharge control that discharges electric power to the common path 62 based on the electric power from the second battery unit 34B, and it is therefore possible to separately adjust the discharge currents. Also, the conversion device 10 can perform the first discharge control and the second discharge control while suppressing the load applied to the capacitors 41 and 51.

The conversion device 10 may also perform a charging operation of supplying electric power to the first battery unit 34A from the common path 62 side via the third conversion circuit 46 that is the one of the plurality of third conversion circuits, the transformer 48 that is the one of the plurality of transformers, and the second conversion circuit 44 that is the one of the plurality of second conversion circuits. Also, the conversion device 10 may also perform a charging operation of supplying electric power to the second battery unit 34B from the common path 62 side via the third conversion circuit 56 that is the other one of the plurality of third conversion circuits, the transformer 58 that is the other one of the plurality of transformers, and the second conversion circuit 54 that is the other one of the plurality of second conversion circuits. Also, the conversion device 10 can perform the charging operations while suppressing the load applied to the capacitors 41 and 51.

The conversion device 10 can charge the second battery unit 34B based on the electric power from the first battery unit 34A by performing the first charge/discharge control. Also, the conversion device 10 can charge the first battery unit 34A based on the electric power from the second battery unit 34B by performing the second charge/discharge control.

When the difference between the output voltage of the first battery unit 34A and the output voltage of the second battery unit 34b is greater than or equal to a predetermined value, the conversion device 10 can perform control to reduce the difference between the output voltages.

The conversion device 10 can switch the high-voltage battery 34 (power supply device) from the series connection to the parallel connection when the following condition is satisfied: the difference between the output voltage of the first battery unit 34A and the output voltage of the second battery unit 34B is less than a threshold value. Accordingly, the conversion device 10 can prevent the high-voltage battery 34 from being switched to the parallel connection while the difference between the output voltages is greater than or equal to the threshold value.

The conversion device 10 can separately perform the operation of discharging electric power to the low-voltage battery 32 (power storage unit) based on the electric power from the first battery unit 34A and the operation of discharging electric power to the low-voltage battery 32 (power storage unit) based on the electric power from the second battery unit 34B using different paths.

Other Embodiments

The present disclosure is not limited to the embodiment described above with reference to the drawings. For example, the features of the embodiment described above and below can be combined in any way unless they are contradictory to each other. Also, any of the features of the embodiment described above and below may be omitted unless it is explicitly described as essential. Furthermore, the above-described embodiment may be changed as described below.

In the above-described embodiment, two first conversion circuit are provided, but three or more first conversion circuits may be provided. In this case, three or more transformers may be provided in one-to-one correspondence with the three or more first conversion circuits. Also, three or more second conversion circuits and three or more third conversion circuits may be provided in one-to-one correspondence with the three or more transformers.

The embodiment disclosed herein is exemplary in all aspects, and thus should not be construed as limiting. The scope of the invention of the present application is not limited to the embodiment disclosed herein, and all changes that come within the scope of the claims or the meaning and range of equivalency of the claims are intended to be embraced within the scope of the invention of the present application.

The invention claimed is:

1. A conversion device used in a power supply system including:
   a power supply device in which a first battery unit and a second battery unit are switched between a series connection and a parallel connection;
   a plurality of first conversion circuits that each convert DC power input to DC ends thereof to AC power and output the AC power to AC ends thereof;
   a plurality of transformers in each of which a first coil that is connected to the AC ends of a corresponding one of the plurality of first conversion circuits is magnetically coupled to a plurality of second coils; and
   a plurality of capacitors that are each connected to the DC ends of a corresponding one of the plurality of first conversion circuits,
   the conversion device comprising:
   the plurality of first conversion circuits;
   the plurality of transformers that are connected to the plurality of first conversion circuits in one-to-one correspondence;
   a plurality of second conversion circuits; and
   a plurality of third conversion circuits,
   wherein one of the plurality of second conversion circuits performs a first operation and a second operation, the first operation being an operation of converting AC power generated at one of the plurality of second coils of one of the plurality of transformers to DC power and outputting the DC power to the first battery unit, and the second operation being an operation of converting DC power input from the first battery unit to generate AC power at the one of the plurality of second coils of the one of the plurality of transformers,
   another one of the plurality of second conversion circuits performs a third operation and a fourth operation, the third operation being an operation of converting AC power generated at one of the plurality of second coils of another one of the plurality of transformers to DC power and outputting the DC power to the second battery unit, and the fourth operation being an operation of converting DC power input from the second battery unit to generate AC power at the one of the plurality of second coils of the other one of the plurality of transformers,
   one of the plurality of third conversion circuits performs a fifth operation of converting AC power input to another one of the plurality of second coils of the one of the plurality of transformers to DC power and outputting the DC power to a common path, and
   another one of the plurality of third conversion circuits performs a sixth operation of converting AC power input to another one of the plurality of second coils of the other one of the plurality of transformers to DC power and outputting the DC power to the common path.

2. The conversion device according to claim 1, comprising:
   a control device that controls the plurality of second conversion circuits and the plurality of third conversion circuits,
   wherein, when the first battery unit and the second battery unit are connected in series, the control device performs first discharge control and second discharge control, the first discharge control being control that causes the one of the plurality of third conversion circuits to perform the fifth operation while causing the one of the plurality of second conversion circuits to perform the second operation, and the second discharge control being control that causes the other one of the plurality of third conversion circuits to perform the sixth operation while causing the other one of the plurality of second conversion circuits to perform the fourth operation, and
   the control device adjusts an output current that is output through the first discharge control and an output current that is output through the second discharge control to reduce a difference between an output voltage of the first battery unit and an output voltage of the second battery unit.

3. The conversion device according to claim 1, wherein the one of the plurality of third conversion circuits performs at least a seventh operation of converting DC power from the common path to AC power and outputting the AC power to the other one of the plurality of second coils of the one of the plurality of transformers, and
   the other one of the plurality of third conversion circuits performs at least an eighth operation of converting the DC power from the common path to AC power and outputting the AC power to the other one of the plurality of second coils of the other one of the plurality of transformers.

4. The conversion device according to claim 3, comprising:
   a control device that controls the plurality of second conversion circuits and the plurality of third conversion circuits,
   wherein, when the first battery unit and the second battery unit are connected in series, the control device selectively performs first charge/discharge control and second charge/discharge control, the first charge/discharge control being control that performs both a control operation of causing the one of the plurality of third conversion circuits to perform the fifth operation while causing the one of the plurality of second conversion circuits to perform the second operation and a control operation of causing the other one of the plurality of second conversion circuits to perform the third operation while causing the other one of the plurality of third conversion circuits to perform the eighth operation, and the second charge/discharge control being control that performs both a control operation of causing the other one of the plurality of third conversion circuits to perform the sixth operation while causing the other one of the plurality of second conversion circuits to perform the fourth operation and a control operation of causing of the one of the plurality of second conversion circuits to perform the first operation while causing the one of the plurality of third conversion circuits to perform the seventh operation.

5. The conversion device according to claim 1, comprising:
   a control device that controls the plurality of second conversion circuits and the plurality of third conversion circuits,
   wherein, when a difference between an output voltage of the first battery unit and an output voltage of the second battery unit is greater than or equal to a predetermined value, the control device causes the plurality of second conversion circuits and the plurality of third conversion circuits to perform an operation of reducing the difference between the output voltage of the first battery unit and the output voltage of the second battery unit.

6. The conversion device according to claim 1, comprising:
a switching unit that switches the first battery unit and the second battery unit between the series connection and the parallel connection,
wherein the switching unit performs switching from the series connection to the parallel connection when the following condition is satisfied: a difference between an output voltage of the first battery unit and an output voltage of the second battery unit is less than a threshold value.

7. The conversion device according to claim 2, wherein the one of the plurality of third conversion circuits performs at least a seventh operation of converting DC power from the common path to AC power and outputting the AC power to the other one of the plurality of second coils of the one of the plurality of transformers, and
the other one of the plurality of third conversion circuits performs at least an eighth operation of converting the DC power from the common path to AC power and outputting the AC power to the other one of the plurality of second coils of the other one of the plurality of transformers.

8. The conversion device according to claim 2, comprising:
a control device that controls the plurality of second conversion circuits and the plurality of third conversion circuits,
wherein, when a difference between an output voltage of the first battery unit and an output voltage of the second battery unit is greater than or equal to a predetermined value, the control device causes the plurality of second conversion circuits and the plurality of third conversion circuits to perform an operation of reducing the difference between the output voltage of the first battery unit and the output voltage of the second battery unit.

9. The conversion device according to claim 3, comprising:
a control device that controls the plurality of second conversion circuits and the plurality of third conversion circuits,
wherein, when a difference between an output voltage of the first battery unit and an output voltage of the second battery unit is greater than or equal to a predetermined value, the control device causes the plurality of second conversion circuits and the plurality of third conversion circuits to perform an operation of reducing the difference between the output voltage of the first battery unit and the output voltage of the second battery unit.

10. The conversion device according to claim 4, comprising:
a control device that controls the plurality of second conversion circuits and the plurality of third conversion circuits,
wherein, when a difference between an output voltage of the first battery unit and an output voltage of the second battery unit is greater than or equal to a predetermined value, the control device causes the plurality of second conversion circuits and the plurality of third conversion circuits to perform an operation of reducing the difference between the output voltage of the first battery unit and the output voltage of the second battery unit.

11. The conversion device according to claim 2, comprising:
a switching unit that switches the first battery unit and the second battery unit between the series connection and the parallel connection,
wherein the switching unit performs switching from the series connection to the parallel connection when the following condition is satisfied: a difference between an output voltage of the first battery unit and an output voltage of the second battery unit is less than a threshold value.

12. The conversion device according to claim 3, comprising:
a switching unit that switches the first battery unit and the second battery unit between the series connection and the parallel connection,
wherein the switching unit performs switching from the series connection to the parallel connection when the following condition is satisfied: a difference between an output voltage of the first battery unit and an output voltage of the second battery unit is less than a threshold value.

13. The conversion device according to claim 4, comprising:
a switching unit that switches the first battery unit and the second battery unit between the series connection and the parallel connection,
wherein the switching unit performs switching from the series connection to the parallel connection when the following condition is satisfied: a difference between an output voltage of the first battery unit and an output voltage of the second battery unit is less than a threshold value.

14. The conversion device according to claim 5, comprising:
a switching unit that switches the first battery unit and the second battery unit between the series connection and the parallel connection,
wherein the switching unit performs switching from the series connection to the parallel connection when the following condition is satisfied: a difference between an output voltage of the first battery unit and an output voltage of the second battery unit is less than a threshold value.

* * * * *